W. A. PATRICK, B. F. LOVELACE AND E. B. MILLER.
METHOD AND APPARATUS FOR SEPARATING VAPORS AND GASES.
APPLICATION FILED DEC. 28, 1918.

1,335,348.

Patented Mar. 30, 1920.
2 SHEETS—SHEET 1.

WITNESS:—
Chas. L. Griesbauer

Inventors
Walter A. Patrick,
Benjamin F. Lovelace,
Ernest B. Miller,
By Foster, Freeman, Watson & Coit, Attorneys

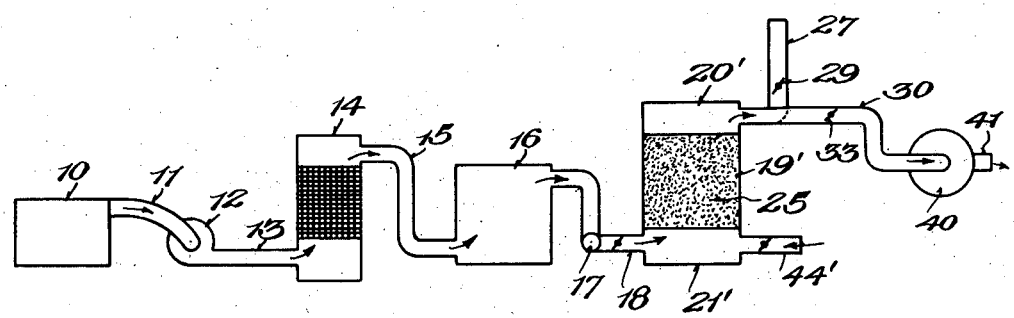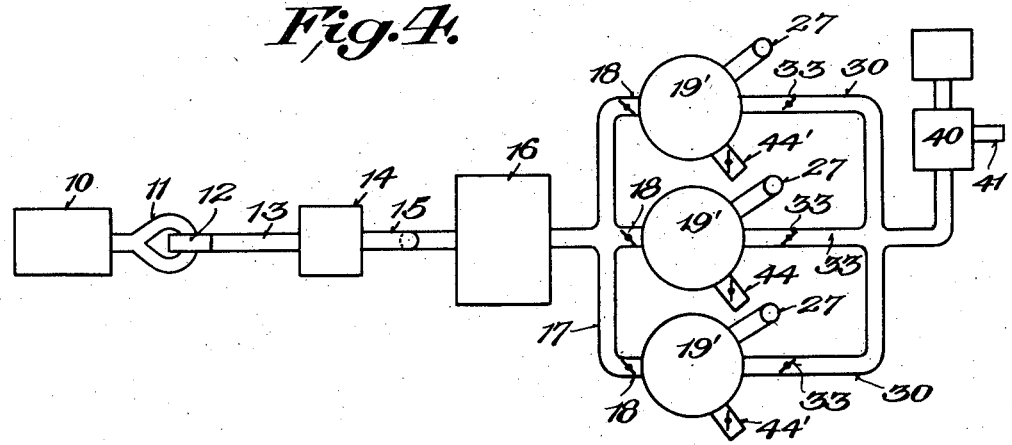

UNITED STATES PATENT OFFICE.

WALTER A. PATRICK, BENJAMIN F. LOVELACE, AND ERNEST B. MILLER, OF BALTIMORE, MARYLAND.

METHOD AND APPARATUS FOR SEPARATING VAPORS AND GASES.

1,335,348.      Specification of Letters Patent.     Patented Mar. 30, 1920.

Application filed December 28, 1918. Serial No. 268,710.

*To all whom it may concern:*

Be it known that we, WALTER A. PATRICK, BENJAMIN F. LOVELACE, and ERNEST B. MILLER, citizens of the United States, and residing at Baltimore city, Maryland, have invented certain new and useful Improvements in Methods and Apparatus for Separating Vapors and Gases, of which the following is a specification.

In industrial processes it is frequently necessary or desirable to separate a gas or vapor from a mixture of gases or vapors. This separation may be, primarily, for the purpose of recovering and utilizing a valuable constituent in the mixture, or it may be merely to remove an impurity.

The present invention aims to provide a method of separating or recovering a gas or vapor from a mixture of gases or vapors or both which eliminates the difficulties and limitations of previous methods, whereby the gas or vapor, even when very diluted, may be recovered at moderate temperatures and pressure.

Briefly stated, the invention consists in passing the mixture of gases or vapors at a moderate temperature and pressure into a gel having pores of a proper size wherein the selected gas or vapor is adsorbed out of the mixture and then recovering the adsorbed gas or vapor by disturbing the equilibrium between the adsorbed gas in the gel and the gas exteriorly thereof. In some cases the mixture of gases prior to being passed into the gel may be cooled.

It has long been known that a fine porous structure is demanded in order to efficiently adsorb fluids but, so far as we are aware, no one has discovered that the size of the pores also controls the liberation or recovery of the adsorbed fluid. This discovery forms an important feature of our invention. The gel employed in our method preferably has pores of such size that the selected gas is adsorbed at a relatively high temperature, but the pores are not so small as to render the recovery or liberation of the adsorbed gas difficult or impossible. The pores of a gel are so small that it is a very difficult matter to accurately determine their size. However, for the purpose of defining the size of the pores required in a gel adapted for use in practising our method, the effect on the vapor pressure of water adsorbed by the gel will afford a sufficiently accurate method of expressing their size and this method will now be described.

It is a well known fact that liquids, provided they wet the surrounding surfaces, have a lower vapor pressure in small capillary tubes than they do in larger vessels. The lowering of the vapor pressure by the liquid within the capillary tube is not appreciable until the diameter of the tube is extremely small. For example, it has been shown that water at 15° C. has a vapor pressure of about 12.5 mm. of mercury, while in a tube of .000005 mm. diameter, the vapor pressure is approximately 6.0 mm. When a gel adsorbs water the first quantities are taken up under low pressure which increases until finally a point is reached where large amounts are taken up at substantially constant pressure. The gel or adsorbing medium employed in our method has pores of such size as to give a vapor pressure of water at 15° C. of from 3 to 11 mm. of mercury when the adsorption of the water has reached the constant pressure phase mentioned above. It is to be understood that the above expresses the limits of the size of pores. It does not mean that any one gel must have pores of various sizes ranging between the limits mentioned. On the contrary, we preferably employ a gel having pores of substantially uniform size, but as will appear hereinafter, the adsorption of certain gases or vapors will be effected more efficiently with a gel having small pores than one having pores approaching the upper limit mentioned above.

We have found that gels having pores of a size within the limits mentioned not only exhibit the adsorptive power characteristic of gels of this general character but at the same time permit easy liberation of the adsorbed gas or vapor. Gels having larger pores have so little adsorptive power as to be valueless commercially. Those having smaller pores have high adsorptive power but will retain the adsorbed material so strongly as to make liberation thereof difficult.

A gel prepared by the coagulation of a collodial solution of silicic acid, thoroughly washed and dried in a suitable manner to give a product containing a small amount of water of hydration, has pores of a size lying within the limits mentioned and will accomplish the desired results in regard to the adsorption and liberation. We preferably employ such a gel. However, other gels having a proper structure might be used. For example, the gels of alumina, ferric oxid, stannic oxid and others, may be prepared so as to satisfy the conditions in regard to the size of the pores.

From the foregoing it will be apparent that in the present method, advantage is taken of the effect which small capillaries have upon the vapor pressure of a liquid. A condensation of the gas or vapor similar to liquefaction is brought about in the small pores of the gel. That is to say, the gas molecules are crowded together in the small interior spaces of the gel to such an extent that, so far as the quantity of matter per unit volume is concerned, the state of the adsorbed material seems to resemble more closely the condition of a liquid than that of a gas. In fact, the evidence seems to indicate that under certain conditions, the gas is actually liquefied in the pores. These effects are obtained under conditions of temperature and pressure widely different from those under which ordinary liquefaction takes place. Thus in order to liquefy sulfur dioxid out of a mixture containing 1% sulfur dioxid and 99% air and working at a temperature of 0° centigrade a pressure is required of the order of magnitude of 100 or 200 atmospheres. If, however, we cause a similar mixture containing even less sulfur dioxid, say 0.5% sulfur dioxid at a pressure of one atmosphere to pass through a gel of silicic acid 0° centigrade, the sulfur dioxid will be practically completely adsorbed for a certain time and this adsorption will take place quite rapidly. For example, if we use 20 grams of gel and the above described mixture is passed through the same at the rate of 400 cubic centimeters per minute, only a trace of sulfur dioxid will be present in the exit gases during the first two or three hours. At about this time a detectable amount of sulfur dioxid begins to come through, the amount increasing with the time.

The amount of sulfur dioxid that will be adsorbed for a unit weight of gel is a function of the temperature at which the adsorption takes place and of the concentration of sulfur dioxid in the air mixture. The amount of sulfur dioxid taken in by the gel increases as the temperature is lowered or the concentration increased. Thus, if as before, 400 cubic centimeters per minute of 0.5% mixture is passed into 20 grams of the gel but the gel is maintained at 5° centigrade instead of 0° centigrade the period over which 100% adsorption is obtained will be shortened. If the operation is carried on at 10° centigrade the period of 100% adsorption will be slightly shorter and at 20° centigrade the period will be still shorter. With higher percentages of sulfur dioxid the period over which 100% adsorption is obtained will be less than for a 0.5% mixture; but the total amount of gas present in the gel at the end of the period of 100% adsorption will be greater. Stated in other words, if a given mixture of $SO_2$ and air is passed over a gel maintained at a given temperature, adsorption will continue to take place until a definite amount of $SO_2$ has been adsorbed. Beyond this point no further adsorption will take place, the concentration of the exit gases being the same as that of the entering gases. If an air mixture containing a higher concentration of $SO_2$ is now passed over the gel, further concentration will take place up to a certain point when the adsorption will again cease. On the other hand, if, having saturated the gel at a given temperature with reference to a particular concentration of $SO_2$, a mixture containing less $SO_2$ is passed over the gel, the gel will give off $SO_2$ for awhile, but ultimately a condition of equilibrium will be established, that is, the concentration of the exit gases will be the same as the entering gases.

Stated in general terms, at a given temperature the gel containing a definite amount of adsorbed $SO_2$ will be in equilibrium with gases exteriorly thereof if the concentration of $SO_2$ in said exterior gases is the proper amount; and either adsorption or liberation will take place if the equilibrium between the adsorbed gas and the exterior gases is disturbed.

The above statements as to the effect of temperature and concentration upon the adsorption of sulfur dioxid apply to the adsorption of gases and vapors in general. The adsorption power of the gel increases with lowering of temperature. In practice, as a general rule, we accordingly adsorb a given vapor at as low a temperature as can be economically maintained. For a vapor which, in the liquid condition, boils under atmospheric pressure at approximately 0° C., adsorption may take place at any temperature up to about plus 30° C. or 40° C. For effective adsorption of gases which in the liquid condition have lower boiling points, as carbon dioxid, for example, correspondingly lower temperatures are necessary. For the adsorption of vapors of liquids with higher boiling points, as ether, acetone, gasoline, etc., there is a much wider range of temperature which may be practically realizable and over which effective adsorption will take place. At ordinary temperatures (20° C. to 30° C.) very efficient adsorption of substances of this type occurs. In so far as a rule can be formulated which will apply to gases and vapors in general, it may be said that, in practice, adsorption may take place either below or not more than about 50° above the temperature at which the liquefied gas boils under a pressure of one atmosphere.

Another important feature of our invention which we desire to emphasize is that a gel having a structure similar to that of silica gel may be made to give off the adsorbed gas or vapor at a temperature not very different from the temperature at which the adsorption takes place. Thus using silica gel, or other gel of similar structure, sulfur dioxid may be adsorbed from a mixture containing less than 1% sulfur dioxid at 10° centigrade or 20° centigrade and liberated at 100° centigrade either in practically pure condition or admixed with air up to nearly 100% sulfur dioxide. Thus if the gel which has been saturated with $SO_2$ by passing over it a 0.5% mixture of $SO_2$ and air at 10° centigrade be maintained at 100° centigrade and a stream of air be sent through it at atmospheric pressure, by regulating the amount of air fed, any desired mixture up to about 25% sulfur dioxid by volume may be obtained. Again, the adsorbed sulfur dioxid may be liberated by air at atmospheric pressure and at a higher temperature, thereby obtaining a higher percentage of sulfur dioxid in the mixture recovered. Another method consists in reducing the pressure exteriorly of the gel. By proper regulation of temperature, pressure and the rate at which air is admitted during the liberation of the adsorbed sulfur dioxid, any desired mixture up to practically 100% sulfur dioxid may be obtained. In all cases the equilibrium between the gas adsorbed in the gel and the same gas in the mixture exteriorly thereof is disturbed.

For the purpose of illustrating a practical application of our invention an apparatus will be described for recovering sulfur dioxid from the exit gases of a metallurgical furnace roasting or sintering ores containing sulfur. It is to be understood, however, that the process is not limited to this particular application, as it may be used for recovering other gases or vapor such as carbon dioxid, ammonia, oxids of nitrogen, the vapors of such liquids as alcohol, ether, acetone, carbon bisulfid, chloroform, gasolene, and many other gases and vapors.

It is to be understood that the present invention does not depend upon a chemical combination between the adsorbent (the gel) and the adsorbed gases. On the contrary, the efficiency of the invention requires that there should be no chemical reaction between the adsorbent and the adsorbed gases. This does not mean, however, that there may not be a chemical combination of two or more gases after they enter the gel.

In the accompanying drawings, in which like reference characters indicate like parts:

Fig. 3 is a diagrammatic view similar to Fig. 1 showing a modified form of the apparatus; and Fig. 4 is a diagrammatic plan view of the apparatus shown in Fig. 3.

Figure 1:
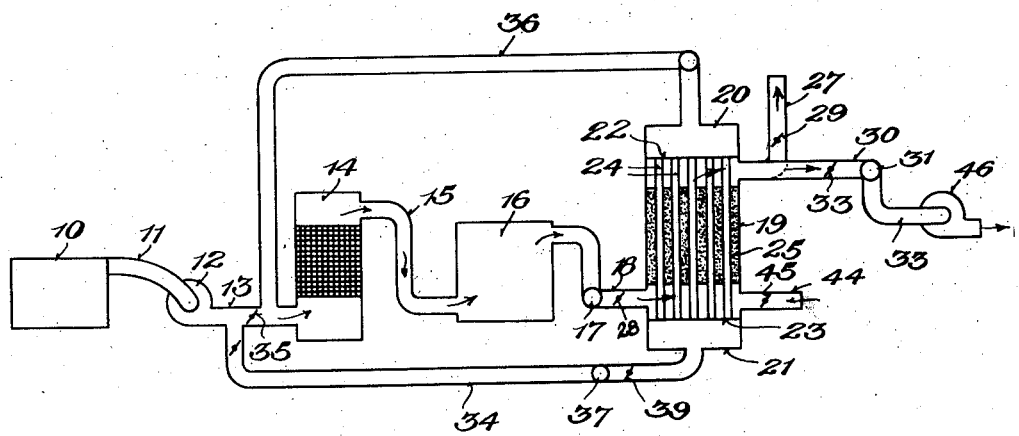
Figure 1 is a diagrammatic view in elevation illustrating one arrangement of apparatus for practising the present invention.
Figure 2:
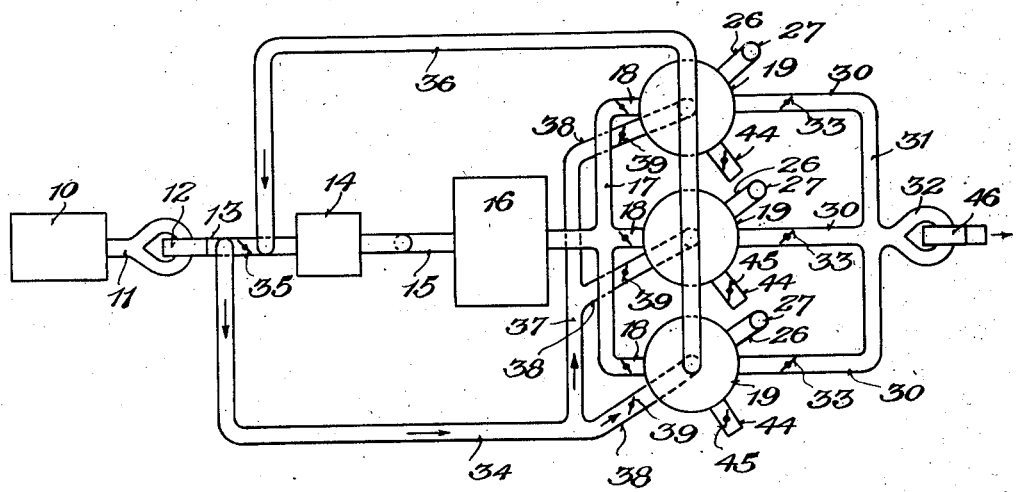
Fig. 2 is a diagrammatic view in plan illustrating the apparatus shown in Fig. 1.

Referring to the drawings the ores, which may contain sulfur, for example, are roasted or sintered in the furnace 10 and the gaseous products of combustion are discharged through a conduit 11 to a blower 12 which forces the gases through the apparatus. From the blower the gases may pass through a conduit 13 to a cooling tower 14, in which the gases are cooled to as low a temperature as can be accomplished with cooling water at river water temperatures, or water from other sources. This tower also serves to wash the gases free of dust, which would be objectionable in subsequent parts of the apparatus. From the tower 14 the gases pass through the pipe 15 to a cooler 16 wherein they are subjected to a standard method of refrigeration, and the temperature thereof further reduced. The cooling of the gases in the tower 14 and cooler 16 also acts to chill out or precipitate moisture from the gases. Preferably the gases are cooled to within a few degrees of the condensation point of the gas to be recovered, although the invention is not limited to this temperature, as the adsorption may take place at a higher temperature, but less efficiently. Obviously, if desired, the cooling tower 14 may be omitted, and the entire cooling performed by the cooler 16.

From the cooler 16 the gases pass to a manifold 17 which has branches 18, discharging into recovery towers 19, three of these towers being shown, although the invention is not limited to any specific number of towers. As shown, these towers consist of shells having an upper head 20 and a lower head 21. In the interior of the shell and spaced from the head 20 is a perforated head 22. A similar head 23 is spaced from the lower head 21. A series of tubes 24 have their open ends mounted in the perforations in the heads 22 and 23. Surrounding the tubes 24 and spaced from the heads 22 and 23 is a gel 25 (having the characteristics previously described) in granular form which is capable of adsorbing the selected gas out of the products of combustion, that is, in the present instance, sulfur dioxid. The branch 18 discharges into the shell 19 below the gel 25 and above the head 23, so that the gaseous products of combustion are passed into the gel 25. The sulfur dioxid is adsorbed by the gel while the other gases pass through the same and are discharged into a pipe 26 and thence to a stack 27.

The cooled mixture of gases is discharged into the gel until there is a trace of sulfur dioxid in the gases leaving the gel. Then the supply of the mixture to the recovery tower is cut off by a valve 28 in the branch 18.

In this form of the invention the gas adsorbed by the gel is now recovered by heating the gel, and at the same time, admitting air through pipe 44 controlled by valve 45, the flow of sulfur dioxid and air discharged being aided by a suction blower 46. The valve 29 in the stack being closed, the sulfur dioxid and air, the quantity of the latter being controlled by valve 45, passes along the pipe 30 to a header 31 and thence through the pipe 32 and suction blower 46 to the place where it is used or stored. A valve 33 is provided in the pipe 30 to close this pipe when the gases are being discharged to the stack 27.

The heat for driving off the sulfur dioxid from the gel may be supplied in any desired manner. As shown, a pipe 34 extends from adjacent the outlet of the blower 12 to the lower head 21 of the recovery tower. A valve 35 in the conduit 13 is closed so that the hot gaseous products of combustion are delivered through the pipe 34 to the recovery tower passing up through the tubes 24 and thereby heating the gel. The gases are then discharged through a pipe 36 leading from the top head 21 of the recovery tower to the conduit 13 at the right of valve 35, as viewed in Fig. 1. They then pass through the cooling tower 14 and cooler 16 and may be discharged into another recovery tower where the sulfur dioxid gas will be adsorbed by a gel in the manner already described. Thus the heat in the gases discharged from the furnace is employed to drive off the sulfur dioxid gas from the gel, and at the same time this operation also acts to cool the products of combustion to a certain extent. The pipe 34 is connected with each of the recovery towers by means of a header 37 which has the branches 38, each leading to a tower, a valve 39 being provided in each branch so that the supply of hot gases to the different towers may be regulated.

The sulfur dioxid gas absorbed by the gel may be recovered in other ways than described above. For example, the gel may be subjected to a partial vacuum. Apparatus for recovering the sulfur dioxid in this manner is illustrated diagrammatically in Figs. 3 and 4. In this form of apparatus the pipes 34 and 36 previously described are omitted and the recovery towers may be of somewhat different form. As shown this tower consists merely of a shell 19' having a gel 25 disposed therein and spaced from the top and bottom heads 20' and 21'. The cooled products of combustion are discharged from the cooler 16 to a header 17 and thence through a branch 18 to the tower, the sulfur dioxid gas being adsorbed in the manner already described. The other gases pass out the stack 27 the valve 29 being open and the valve 33 in the pipe 30 being closed. After the gel has adsorbed the sulfur dioxid, the valve 29 is closed and the valve 33 opened thereby putting the gel in communication with a vacuum pump 40, which draws off the sulfur dioxid and discharges it through a pipe 41, air being admitted to the shell below the gel through a valve controlled pipe 44'.

It is obvious that, instead of cooling the mixture before delivering it to the gel, the gel might be cooled, thus accomplishing the same results.

Where the term "boiling point" has been used in the specification and claims, it is intended to refer to the boiling point at atmospheric pressure unless otherwise specified.

Where the specification and claims mention the separation and recovery of a gas or vapor from a mixture of gases or vapors, it is to be understood, in actual practice of the present method, usually more than one gas or vapor is adsorbed out of the mixture. Thus in recovering sulfur dioxid from the exit gases of a metallurgical furnace roasting or sintering ores containing sulfur, there is present in the exit gases some water vapor and carbon dioxid which are adsorbed with the sulfur dioxid. Hence the phrase "separation or recovery of a gas or vapor from a mixture of gases or vapors" is intended to cover the separation and recovery of one or more gases or vapors from a mixture of gases or vapors.

Although an apparatus for carrying out the method has been described specifically, it is to be understood that the invention is not thus limited, but includes changes and modifications which come within the scope of the appended claims.

Having thus described the invention what is claimed as new and desired to be secured by Letters Patent is:—

1. The method of separating and recovering a gas or vapor from a mixture of gases or vapors, consisting in passing the mixture into a porous body having pores substantially of the size of the pores in hydrated silicon dioxid gel, and thereafter effecting the liberation of the gas or vapor adsorbed in said body.

2. The method of separating and recovering a gas or vapor from a mixture of gases or vapors, consisting in passing the mixture into a hydrated silicon dioxid gel and thereafter effecting the liberation of the adsorbed gas or vapor.

3. The method of separating and recovering a gas or vapor from a mixture of gases or vapors consisting in adsorbing the gas or vapor out of the mixture in a gel at a temperature above the boiling point of the liquefied gas or vapor and thereafter effecting the liberation of the adsorbed gas or vapor.

4. The method of separating and recovering a gas or vapor from a mixture of gases or vapors, consisting in cooling the mixture to a temperature above the boiling point of the liquefied gas or vapor passing the cooled mixture into a gel having pores of substantially the same size as the pores in hydrated silicon dioxid gel and thereafter effecting the liberation of the adsorbed gas or vapor.

5. The method of separating and recovering a gas or vapor from a mixture of gases or vapors consisting in cooling the mixture to a temperature above the boiling point of the liquefied gas or vapor passing the cooled mixture into a gel having pores of a size to give a vapor pressure of water at 15° C. of from 3 to 11 milimeters of mercury and thereafter effecting the liberation of the adsorbed gas or vapor.

6. The method of separating and recovering a gas or vapor from a mixture of gases or vapors, consisting in passing the mixture into a gel having pores of a size to give a vapor pressure of water at 15° C. of from 3 to 11 millimeters of mercury to adsorb the gas or vapor out of the mixture, the adsorption taking place at a temperature above the boiling point of the liquefied gas or vapor, and thereafter recovering the adsorbed gas or vapor from the gel.

7. The method of separating and recovering a gas or vapor from a mixture of gases or vapors, consisting in passing the mixture into a porous body having pores of a size to give a vapor pressure of water at 15° C. of from 3 to 11 millimeters of mercury and thereafter effecting the liberation of the adsorbed gas or vapor.

8. The method of separating and recovering a gas or vapor from a mixture of gases or vapors, consisting in cooling the mixture to a temperature above the boiling point of the liquefied gas or vapor, passing it into a gel capable of adsorbing said gas or vapor out of the mixture and thereafter effecting the liberation of the gas or vapor adsorbed in the gel.

9. The method of separating a gas or vapor from a mixture of gases or vapors consisting in adsorbing the gas out of the mixture in a gel having pores of a size to give a vapor pressure of water at 15° centigrade of from 3 to 11 millimeters of mercury, said adsorption taking place at a temperature above the boiling point of the liquefied gas or vapor and thereafter disturbing the equilibrium between the adsorbed gas in the gel and the same gas exteriorly of the gel to liberate the adsorbed gas or vapor.

10. The method of separating and recovering a gas or vapor from a mixture of gases or vapors consisting in passing the mixture into a gel capable of adsorbing said gas or vapor out of the mixture, and thereafter slightly heating the gel to effect the liberation of the adsorbed gas or vapor.

11. The method of separating and recovering a gas or vapor from a mixture of gases or vapors consisting in passing the mixture into a gel capable of adsorbing said gas or vapor out of the mixture, and thereafter slightly heating the gel in a stream of air to effect the liberation of the adsorbed gas or vapor.

12. The method of separating and recovering a gas or vapor from a mixture of gases or vapors consisting in passing the mixture into a gel having pores of substantially the same size as the pores in hydrated silicon dioxid gel and thereafter disturbing the equilibrium between the adsorbed gas in the gel and the same gas exteriorly thereof to liberate the adsorbed gas or vapor.

13. The method of separating and recovering a gas or vapor from a mixture of gases or vapors consisting in passing the mixture into a gel having pores of a size to give a vapor pressure of water at 15° C. of from 3 to 11 millimeters of mercury to adsorb the gas or vapor out of the mixture, both the mixture and gel being at temperatures above the boiling point of the liquefied gas or vapor, and thereafter recovering the adsorbed gas or vapor from the gel.

14. The method of recovering sulfur dioxid from a mixture of gases consisting in passing said mixture at a temperature above the boiling point of sulfur dioxid into a gel capable of adsorbing the sulfur dioxid out of said mixture and thereafter recovering the sulfur dioxid from the gel.

15. The method of separating and recovering a gas from a mixture of hot gases consisting in cooling said mixture, passing the cooled mixture into a gel capable of adsorbing said gas out of the mixture, and thereafter heating said gel by the hot gases to liberate the adsorbed gas.

16. The process of recovering sulfur dioxid from the gaseous products of combustion resulting from burning sulfur containing ores, consisting in cooling the said products, passing them into a gel capable of adsorbing sulfur dioxid, and heating said gel by the hot products of combustion to drive off the adsorbed sulfur dioxid.

17. In the method of separating and recovering a gas from a mixture of gases, the step of recovering the gas previously adsorbed in a gel consisting in disturbing the equilibrium between the adsorbed gas in the gel and the same gas exteriorly thereof.

In testimony whereof we affix our signatures.

WALTER A. PATRICK.
BENJAMIN F. LOVELACE.
ERNEST B. MILLER.